(No Model.)  J. P. WICK.  3 Sheets—Sheet 1.
POTATO PLANTER.

No. 295,846.  Patented Mar. 25, 1884.

Attest:
Walter Douaean
F. L. Middleton

Inventor
John P. Wick
by Joyce & Spear
Attys.

(No Model.) 3 Sheets—Sheet 2.
J. P. WICK.
POTATO PLANTER.
No. 295,846. Patented Mar. 25, 1884.
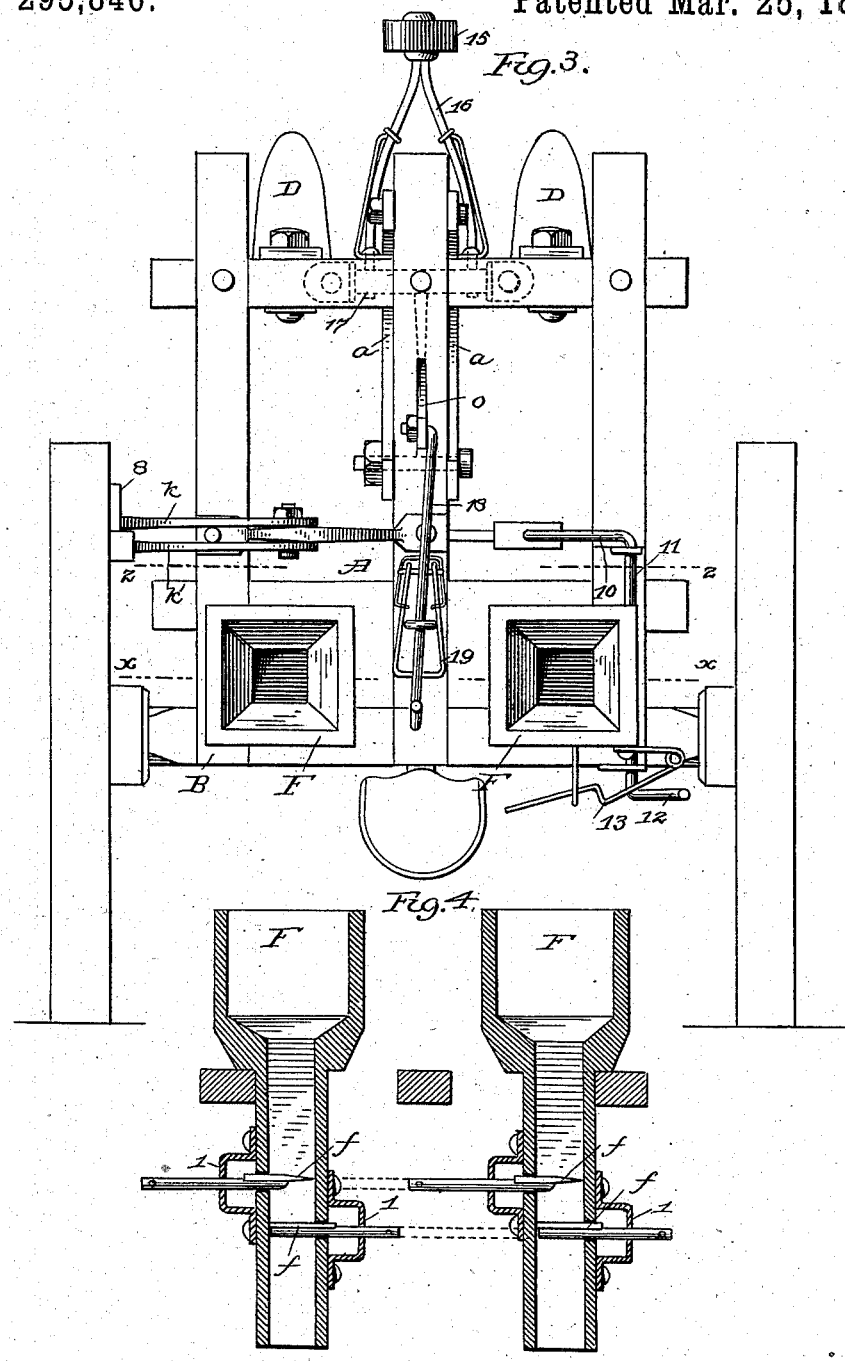

(No Model.) 3 Sheets—Sheet 3.

J. P. WICK.
POTATO PLANTER.

No. 295,846. Patented Mar. 25, 1884.

Attest:
Walter Donaldson
F. L. Middleton

Inventor
John P. Wick
by Joyce & Spear
Att'ys.

UNITED STATES PATENT OFFICE.

JOHN P. WICK, OF PARMA, OHIO.

POTATO-PLANTER.

SPECIFICATION forming part of Letters Patent No. 295,846, dated March 25, 1884.

Application filed November 21, 1883. (No model.)

*To all whom it may concern:*

Be it known that I, JOHN P. WICK, of Parma, in the county of Cuyahoga and State of Ohio, have invented a new and useful Improvement in Potato-Planters; and I do hereby declare that the following is a full, clear, and exact description of the same.

My invention is an improved potato-planter. The invention consists of devices whereby the large potatoes may be cut when the machine is in operation, and in details of construction, all as hereinafter described.

Figure 1:
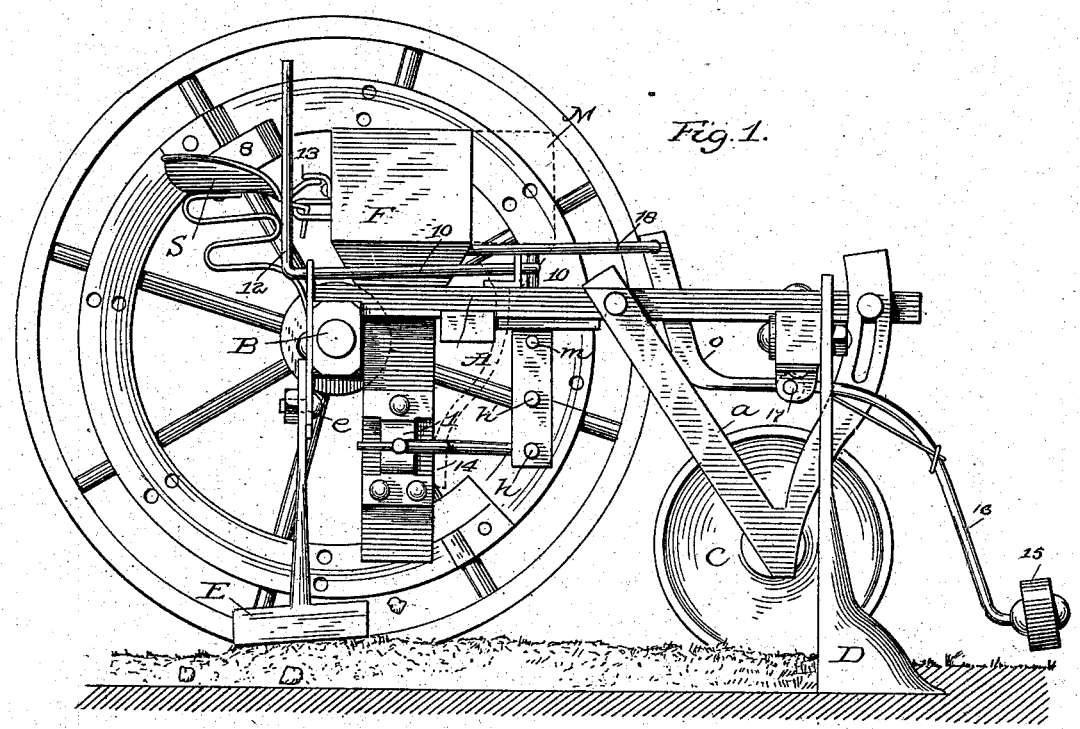
Figure 2:
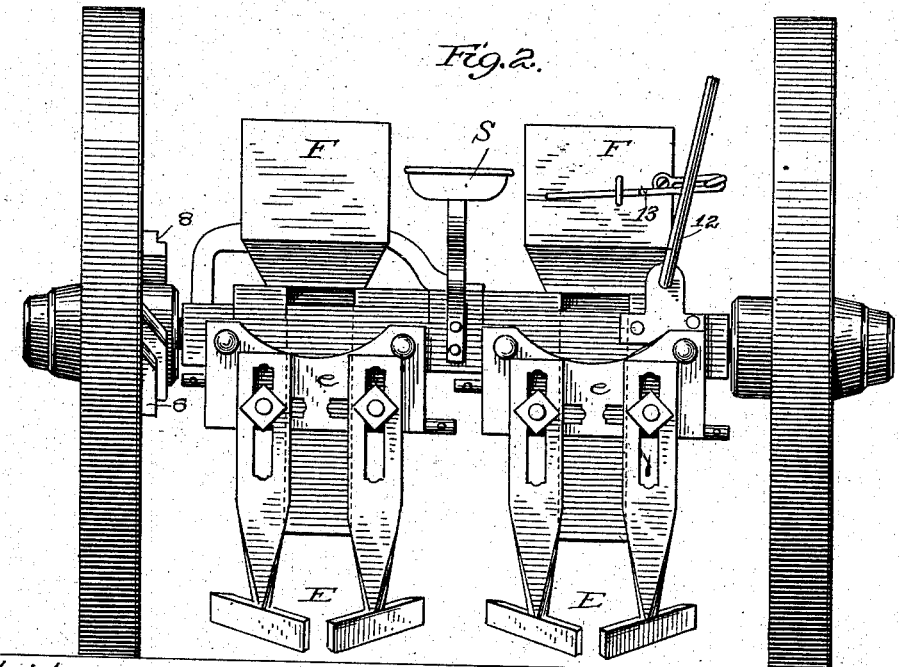
Figure 5:
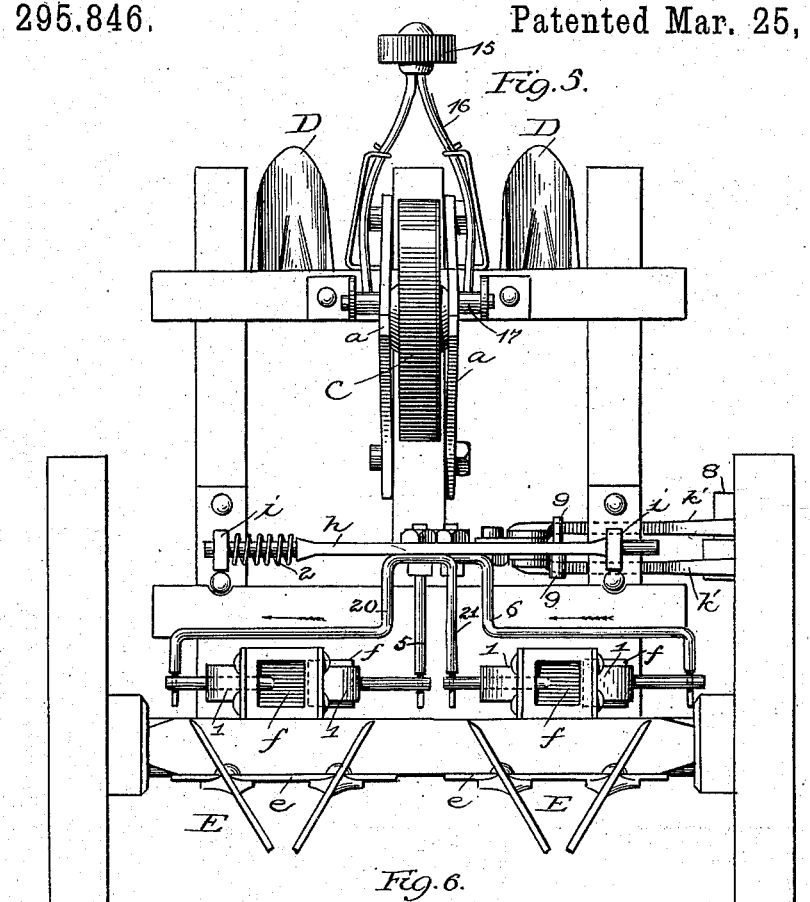
Figure 6:
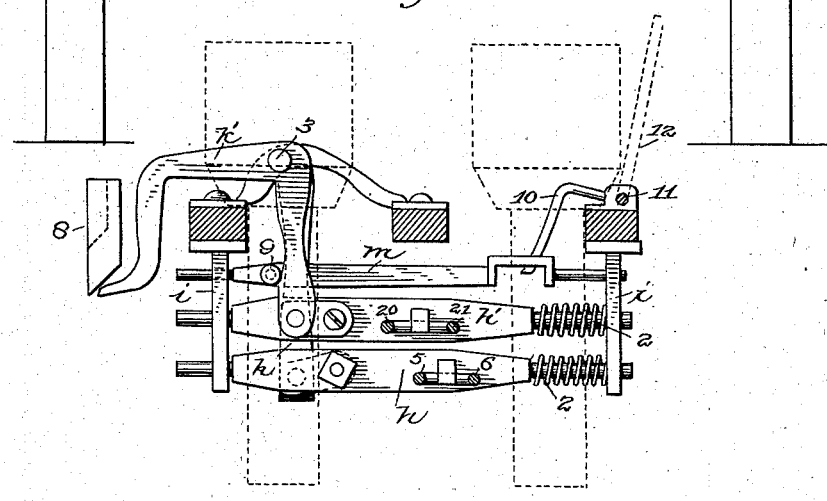

In the accompanying drawings, Figure 1 is a side elevation of the machine with one wheel removed. Fig. 2 is a rear elevation; Fig. 3, a plan view; Fig. 4, a section on line $xx$ of Fig. 3. Fig. 5 is a bottom view; Fig. 6, a section on line $zz$ of Fig. 3.

The frame-work which carries the machinery (shown at A) is supported at its rear end directly upon its axle B and at its front upon a small wheel, C. The wheel C is pivoted in the lower end on V-shaped hangers $a$, the rear ends of which are pivoted upon the center-piece of the body-wheel. The front arms are slotted and connected to the same piece by a bolt to permit vertical adjustment. Shovels D are attached to the front cross-beam by bolts passing through slots, and the covering-scrapers E are in like manner attached to plates $e$ upon the axle. The connecting-bolts of the scrapers pass through horizontal slots in the plates, so that the scrapers can be adjusted both laterally and vertically. The boxes F, for the potatoes, are mounted on the body in front of the axle, with vertical tubes from the bottom opening below in front of the scrapers. Applied to each of these tubes are two valves, $f$—one above the other. They are provided with stems which pass through brackets 1. The lower or stop valve simply obstructs the passage; but the other is made sharp upon its forward edge for the purpose of cutting the potatoes. The upper or cutting valve is placed above the lower a distance sufficient to allow the small potatoes to rest upon the lower valves without being cut, but to sever the larger.

The mechanism for operating the valves is shown more clearly in Fig. 6. The cross-bar $h$ slides in hangers $i$, being pressed to the left of the machine by spring 2. It is operated by the bell-crank lever $k$, pivoted to a bracket on the frame at 3, and having its free arm bent down into the path of the cam-block 8, adjustable on the wheel. The bar $h$ is thrown to the right when the cam-block strikes the end of the lever. The bar is connected to the stems of the two lower valves by arms 5 6. The spring which returns the bar closes the valves automatically. Above the bar $h$, supported in the same brackets, is a sliding bar, $h'$, which operates the upper valves. It is operated by a bell-crank lever, $k'$, similar to lever $k$, and pivoted at the same point. Its free end extends into the path of the cam-block 8, set on the wheel a little in advance of that heretofore mentioned. The bar $h'$ is provided with a spring similar to that of bar $h$, for automatically turning the upper valves, and is connected to the upper valve-stems by arms 20 21. The cam-blocks are made just long enough to hold the lower valves open to allow for the passage of the seed. Above the bar $h$ is another bar, $m$, sliding laterally in the hangers, and provided with a transverse pin, 9, which, when the bar is moved to the right of the machine, presses against both bell-crank levers and moves them to the right, thus throwing their free ends out of the path of the cam-block, which is necessary in turning the machine. In this case the upper valves are closed and the lower open. The bar $m$ is moved by means of a bent arm, 10, upon the shaft 11, the handle 12 of which is in reach of the driver, and is held by the spring-catch 13.

From the description heretofore given it will be understood that in each tube one valve is always closed, for one closes when the other opens; and, further, when not operated by the cam-block the lower is closed and the upper opened. By reason of the advanced position of the block which works the upper or cutting valve the valve is worked a little in advance of the lower, so as to sever the potato in its path, and to close the passage before the lower valve is open to drop the seed. I may use in front of the seed-box a fertilizer-box, M, with a tube, 14, (these being shown in dotted lines in Fig. 1,) running down in front of the seed-box, and this may be provided with suitable valves in any well-known way.

In addition to the devices described for throwing the apparatus out of gear with the cam-blocks when turning or moving to or from the field, I have provided means for supporting the forward part of the body for turning the same. This consists of a small truck-wheel, 15, mounted upon a pronged arm, 16, of a rock-shaft, 17, pivoted beneath and to the front cross-beam. This shaft has an upwardly-bent arm, o, from which a rod, 18, runs back toward the driver's seat. It has an upwardly-bent end, which may be in reach of the driver's hand or foot, and by pressing it forward the truck-roller is thrown down to raise the forward end off from the main forward wheel. The spring-catch 19, adapted to be removed by the driver's foot, holds the arm 18, and thus maintains the front of the body upon a small truck, which is set so as to roll the front part laterally. The seat S is supported upon the axle in central position. The cam-blocks upon the wheels are adjustably attached to a ring fixed to the wheel, and they can be set in different holes in the said ring, according to the distance desired between the hills.

I do not broadly claim in a potato-planter the elements of a stop-valve and a cutting-valve and connected mechanism for operating such valves from cams on the wheels, my invention being limited to the devices and combinations claimed.

I claim as my invention—

1. In a potato-planter, a seed box and tube, in combination with a stop-valve and a cutting-valve, and independent mechanism, substantially as described, for each of said valves, leading to cam-blocks on the wheel, whereby said valves are operated independently in a certain relation to each other, substantially as described.

2. In combination with the body and wheels, the seed box and tubes, the upper cutting and lower stop valve, the bars $h$ and $h'$, for giving independent movement to the said valves, with their springs and the bell-crank levers $k k'$ and the cam-blocks, one set in advance of the other, the parts being constructed, arranged, and operating all substantially as described.

3. In combination with the bell-crank levers $k k'$, the valves, the bars $h h'$, with their springs and rods, as described, between said valves and levers, the bar $m$, having pin 9 bearing upon the levers, and a lever, 10, acting upon the rod $m$, whereby the driver may throw the bell-crank levers out of the path of the cam-blocks, all substantially as described.

In testimony whereof I have signed my name to this specification in the presence of two subscribing witnesses.

JOHN P. WICK.

Witnesses:
PHILIP REICHERT,
WM. NORRIS.